Dec. 13, 1949     H. W. CARDWELL ET AL     2,491,087
AIR CONTROLLED SHIFTING MECHANISM

Filed July 30, 1947     2 Sheets-Sheet 1

Inventors
Harland W. Cardwell
and James W. Haupt
By Bacon & Thomas
Attorneys

Dec. 13, 1949 H. W. CARDWELL ET AL 2,491,087
AIR CONTROLLED SHIFTING MECHANISM
Filed July 30, 1947 2 Sheets-Sheet 2

Inventors
Harland W. Cardwell
and James W. Haupt
By Bacon & Thomas
Attorneys

Patented Dec. 13, 1949

2,491,087

UNITED STATES PATENT OFFICE 2,491,087

AIR CONTROLLED SHIFTING MECHANISM

Harland W. Cardwell and James W. Haupt, Wichita, Kans.

Application July 30, 1947, Serial No. 764,835

3 Claims. (Cl. 74—346)

This invention relates to gear shifting mechanisms wherein the ratio of drive from a source of power to a driven member may be varied at the will of the operator.

It is an object of this invention to provide such a gear shifting mechanism that can be operated by a fluid under pressure, preferably air, from a remote control station.

It is a further object of this invention to provide a gear shifting mechanism that is simple and economical in construction providing for maximum efficiency and dependability in operation.

It is a further object of this invention to provide a fluid pressure operated gear shifting mechanism that may be applied to a conventional transmission.

It is a still further object of this invention to provide such a gear shifting mechanism wherein a fluid under pressure will actuate means to effect the desired gear ratio and wherein continued application of the fluid pressure will not cause undue wear of the operated parts.

In general, these objects are attained by providing a longitudinally movable shifter member and fluid pressure operated means at each end thereof and provided with stop means whereby when the shifter member has moved to the proper gear engaging position the pressure is absorbed by the stop means instead of being transmitted to the movable member actuated by the shifter.

In the accompanying drawings there is illustrated a preferred embodiment of this invention, and in which.

Figure 1:
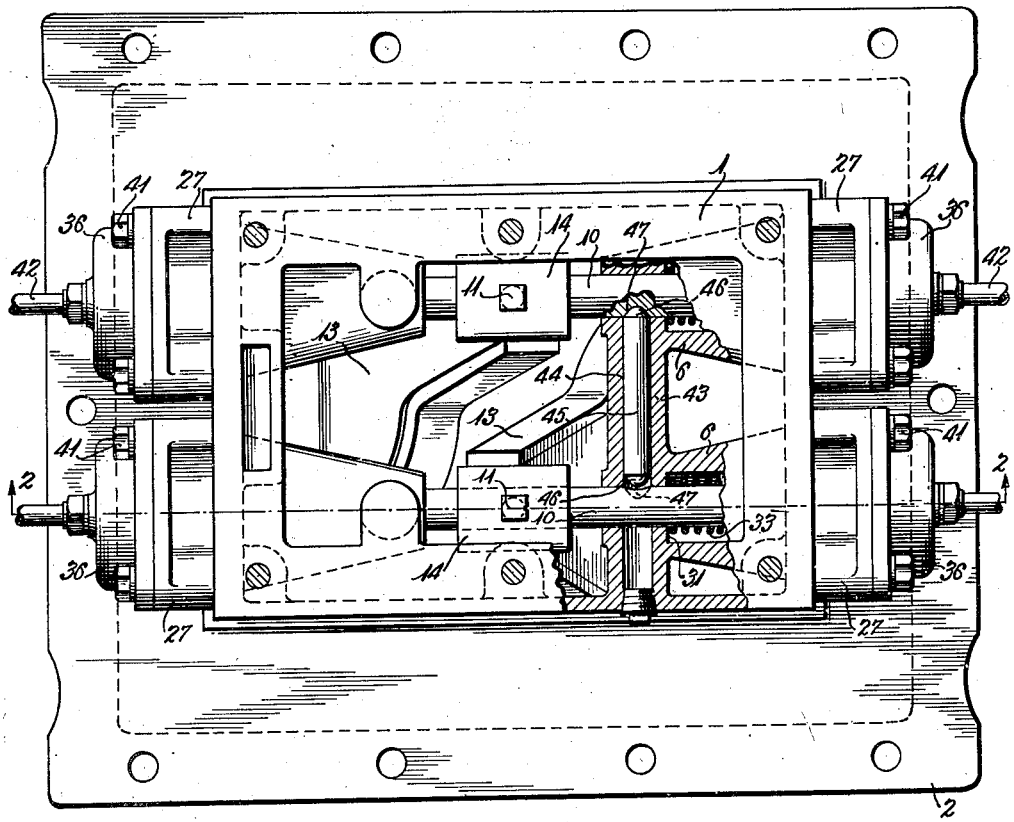
Figure 1 is a plan view of the gear shifting mechanism with the cover plate being removed and certain parts shown in section.
Figure 3:
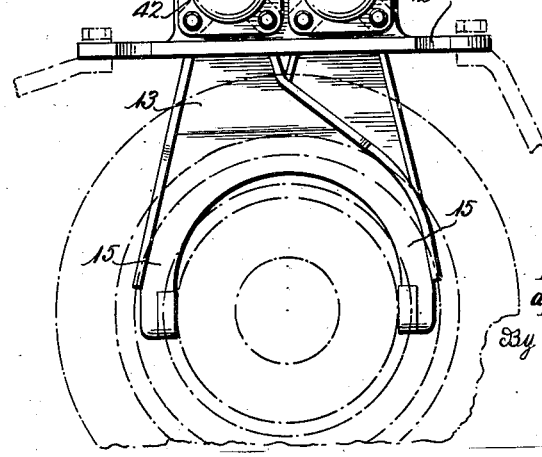
Figure 3 is an end elevational view of the mechanism of Figure 1 on a reduced scale.

In the illustrated embodiment of the gear shifting mechanism a supporting frame 1 is provided with a flange 2 whereby it may be bolted or otherwise secured to a housing containing a set of selective transmission gears. A cover plate 3 is provided for the frame member and may be attached thereto by means of cap screws such as shown at 5. If desired the cover plate may be provided with a gasket 5a.

The frame member 1 is provided with two pairs of opposed bosses or guide members 6 each having a bore 7 therethrough aligned with a corresponding bore in the opposed boss. Each boss is further provided with an enlarged bore 8 and a still larger bore 9. Longitudinally slidable in bores 7 is a shifter rod 10 having attached thereto as by means of set screws 11 engaging recesses 12, a shifter fork 13. Each of said shifter forks comprises a hub portion 14 carried by the shifter rod 10 and a pair of arms 15. Each of said arms 15 engages in diametrically opposed portions of a groove 16 in a clutch member 17. The clutch member 17 may be thereby moved axially of the shaft 18 to selectively engage said shaft in driving engagement with gear 19 or 20 or gear 21 or 22, all as is well known in the art.

Each end of the shifter rod 10 is provided with a cap member 23. The cap members 23 are locked to the ends of the shifter rod 10 by means of pins 24. A circumferential groove 25 is provided in each of the cap members 23 and overlies the ends of the locking pins 24 and a split ring 26 is sprung into each of the grooves 25 and acts to retain the locking pins 24 in position to lock the cap members 23 to the shifter rods 10. A housing member 27 is provided adjacent each end of each shifter rod and each of said housing members has an internal bore 28 of a diameter sufficient to allow free movement therethrough of the cap members 23 but of a lesser diameter than the enlarged bores 9 of the bosses 6 whereby to present shoulder or abutment portions 29. A washer member 30 is provided at each end of each shifter rod 10, slidable axially thereon and positioned in the enlarged bores 9. It will be noted that the bores 7, 8 and 9, being of different diameters provide shoulder or abutment portions 31 and 32. A compression spring 33 surrounds the shifter rod 10 and reacts at one end against the shoulder or abutment 31 of the boss 6 and reacts at its other end against the slidable washer 30. It is to be understood that this structure is duplicated at each end of each of the shifter rods.

The housing members 27 are provided at their outer ends with annular seats 34 against which the outer peripheral portions of diaphragms 35 are positioned. The diaphragm 35 is preferably made of molded rubber but can with equal facility be made of any other suitable material that is impervious to air and yet flexible enough for the purpose to be described. A cap member 36 having a recessed portion 37 is positioned over the housing member 27 and acts to clamp the edges of the diaphragm to said housing member and provides with said diaphragm an expansible pressure chamber 40 having the diaphragm as one wall thereof. Cap screws 41 pass through the outer portions of the cap member 36 and the housing member 27 and are threadedly engaged with the frame member 1 to hold the above-described elements in assembled relationship and provide the necessary clamping pressure to effect a fluid-tight seal between the members 27 and 36 and the flexible diaphragm 35.

Each of the cap members 36 is provided with a fitting 42 whereby fluid under pressure may be admitted to the above-described chambers. It is to be understood that a suitable source of fluid under pressure and suitable control means are provided whereby an operator may selectively admit fluid under pressure to any desired one of the chambers 40. The source of fluid and the control means are not shown but embodiments will be apparent to those skilled in the art.

As stated above, the mechanism of this invention is provided with two shifter rods 10 (Figure 1). As shown the frame member 1 is further provided with a bridge 43 extending between two of the bosses 6 and said bridge member is further provided with a bore 44 extending transversely of and intersecting the bores 7. A locking pin 45 is positioned in the said bore 44 between the shifter rods 10 and is provided with conical end portions 46. As shown in Figure 1 the shifter rods 10 are in their central or neutral position, that is in the position where the clutch members 17 do not connect any of the gears controlled thereby to the shaft member 18. With the shifter rods 10 in this midposition the conical recesses 47, one in each rod, are opposed and in alignment with the bore 44 whereby the locking pin 45 may be moved in the bore 44 to position one of its ends in either of the recesses 47. The overall length of the locking pin 45 is such that when one of its ends is in a recess 47 its other end just clears the side of the other shifter rod 10. Thus, it will be seen that if the upper shifter rod 10 (as seen in Figure 1) is moved to either the right or left of the position shown, the pin 45 will be forced downwardly so that its lower end enters the recess 47 in the lowermost shifter rod 10 and since the upper end of said locking pin 45 will just clear the edge of the upper shifter rod 10 said locking pin will be forced to remain with its lower end in the recess 47 of the lower shifter rod 10, thus locking said lower shifting rod in its neutral position until such time as the upper shifting rod may be returned to its neutral position.

Figures 2, 4, 5:
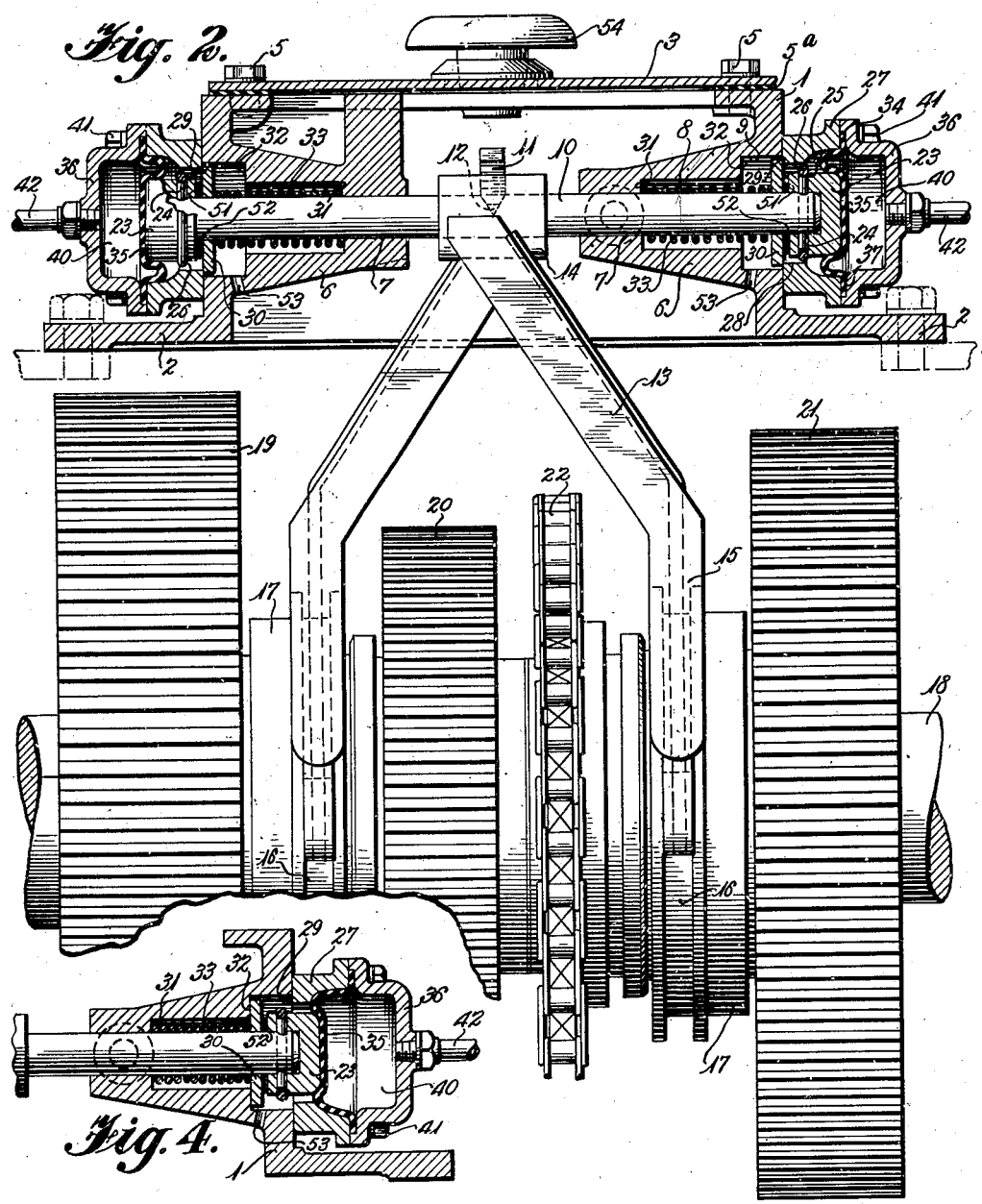
Figure 2 is a vertical sectional view taken on line 2—2 of Figure 1 looking in the direction of the arrows and with the shifter rod in its central or neutral position.
Figures 4 and 5 are detailed sectional views of a portion of the shifter mechanism in opposed extreme positions.

As shown in Figure 2 the shifter rod 10 is in its mid or neutral position and the stop or shoulder portions 51 of the cap members 23 are adjacent the outer surface of the slidable washers 30. Since it is impractical to manufacture the frame members 1, shifter rods 10, and cap members 23 to the exact desired dimensions, it is usually necessary to provide washers or shim elements 52. With the parts in the position shown in Figure 2, the compression springs 33 will urge the slidable washers 30 outwardly into abutting engagement with the shoulder or abutment portions 29 of the housing members 27 but will be unable to move the washers 30 outwardly beyond that position. The washer or shim elements 52 are provided to occupy any space that may remain between the stops or shoulders 51 of the caps 23 and the outer surface of the washers 30 whereby said shifter rods 10 will be maintained in their mid or neutral position without appreciable longitudinal play. In other words, the shims or washers 52 in effect extend the stops or shoulders 51 so that the distance between them is substantially equal to the distance between shoulders or abutments 29. It is to be understood that the shim or washer elements 52 may comprise a single member or a plurality of members, whichever may be necessary or convenient to properly position the shifter rods 10 relative to the frame member 1.

Each of the bosses 6 is further provided with a vent opening 53 communicating with the space between the bore 7 and the diaphragm 35 to provide a release for the pressure built up in said space during flexure of the diaphragm. The vents 53 also provide for the exhaust from said space of any air under pressure that may leak past the diaphragm 35. The cover plate 3 is also provided with a vent or breather cap 54, of known construction, to relieve any pressure that may be built up in the transmission housing due to leakage of any of the diaphragms 35. Such pressure in the transmission housing would have a detrimental effect on the enclosed mechanism since it would tend to force the lubricant out of the housing through the supporting bearings or other openings.

If fluid under pressure is admitted to the chamber 40, shown at the right side of Figure 2, it will be apparent that the diaphragm will be flexed to the left and the shifter rod 10 will likewise be moved to the left to the position shown in Figure 4. Movement of the shifter rod 10 to the position shown in Figure 4 is resisted by the compression spring 33 but the pressure of the fluid employed will be sufficient to overcome the resistance of said spring. The fluid pressure will act through diaphragm 35, cap member 23, shim elements 52 and washer 30 to compress said spring and move the shifter rod to the left until the washer 30 engages the shoulder or abutment 32 as shown. It is to be understood that the parts described are so proportioned and of such dimension that when the washer 30 engages the shoulder or abutment 32, the shifter rod 10 and its associated fork 13 will have moved the appropriate clutch member 17 just the right amount to engage the selected gear with the shaft 18, thus continued application of fluid pressure after the parts have reached the position of Figure 4 will not result in any pressure being transmitted to the walls of the groove 16 in the clutch member 17 thus relieving said clutch member of continued pressure which would cause undue wear and shorten the life of the transmission mechanism in addition to absorbing part of the power transmitted through said mechanism. Upon release of the pressure from the right hand chamber 40, the spring 33 being under compression will act through washer 30, shims 52 and cap 23 to move the shifter rod 10, fork 13, and clutch 17 to the right until the washer 30 engages the shoulder or abutment 29 as shown in Figure 2. At this point, as will be apparent, the spring 33 will be ineffective to move the shifter rod 10 any further to the right. Since the above-described structure is duplicated at each end of the shifter rod 10 and since the spring at each end is effective to return the shifter rod to neutral position from only one of the extreme positions of the shifter rod, it will be apparent that the mechanism will operate as described even though the two springs 33 on either shifter rod are of unequal strength. This is an important feature since great care will not have to be exercised in selecting and matching the springs to be used. The positive stops provided by the shoulders or abutments 29 and 32 positively limit the movement of the shifter rod 10 in either direction irrespective of the strength of the springs employed to return the shifter rod from its extreme positions.

Figure 5 illustrates the relative positions of the parts shown in Figure 4 when pressure is admitted to the chamber 40 shown at the left of Figure 2. As is clear from Figure 5 the right hand spring 33 and associated washer 30 are inactive during movement of the shifter rod to the right of its neutral position and the spring and washer assembly at the left end of Figure 2 are the only ones partaking of any movement of the shifter rod and acting to return the shifter rod to its neutral position.

In the preferred embodiment illustrated and described the fluid employed is compressed air but it is to be understood that any other suitable fluid under pressure may be employed with equal facility.

While a single preferred embodiment of the invention has been illustrated and described it is not intended that the invention be limited thereto but shall include all modifications falling within the scope of the appended claims.

We claim:

1. Gear shifting mechanism comprising: a longitudinally slidable shifter rod having spaced opposed stop means thereon, and a member slidable thereon inwardly of each of said stop means; each of said slidable means having an outwardly directed radial face, a pair of opposed springs, each of said springs reacting against a fixed surface and urging one of said slidable members outwardly to engage a portion of said radial face with the adjacent stop means on said rod; a fixed abutment outwardly of each of said slidable members, the said abutments being spaced apart a distance substantially equal to the distance between said opposed stop means, whereby said springs will normally urge each of said slidable members to engage another portion of said radial face with its outermost abutment and hold said rod in its central position irrespective of the relative strength of said spring means.

2. Gear shifting mechanism comprising: a longitudinally slidable shifter rod having spaced opposed stop means thereon, and members slidable thereon inwardly of said stop means; a pair of opposed springs, each of said springs reacting against a fixed surface and urging one of said slidable members outwardly into engagement with the adjacent stop means on said rod; a fixed abutment outwardly of each of said slidable members, the said abutments being spaced apart a distance substantially equal to the distance between said opposed stop means, whereby said springs will normally urge each of said slidable members into engagement with its outermost abutment and said stop means and hold said rod in its central position irrespective of the relative strength of said spring means; a second fixed abutment inwardly of each slidable member to be engaged thereby to limit the inward movement of said slidable members from said central position and in turn to limit the inward movement of said rod by engagement of one of said spaced stop means with said slidable member.

3. Gear shifting mechanism comprising: support means, a shifter rod longitudinally slidable on said support means with one end projecting through a surface thereof, an enlarged bore in said support means extending to said surface and through which said rod extends, stop means on said rod adjacent said one end and an abutment in said bore between the bottom thereof and said surface, a member slidable on said rod inwardly of said stop means and within said enlarged bore between said abutment and said surface, resilient compression means abutting the bottom of said bore and engaging said slidable member, an annular extension fixed to said support means about said rod and against said surface and having an opening through which said rod projects, said opening being of lesser diameter than said enlarged bore and being concentric therewith whereby to present an inwardly facing shoulder against which said slidable member may abut, a flexible diaphragm seated on said annular support means in abutment with the said end of said rod, the distance between the said abutment and shoulder being no greater than the range of movement of said diaphragm.

HARLAND W. CARDWELL.
JAMES W. HAUPT.

REFERENCES CITED

The following references are of record in the file of this patent:

UNITED STATES PATENTS

| Number | Name | Date |
|---|---|---|
| 1,499,384 | Lee | July 1, 1924 |
| 1,806,669 | Campbell | May 26, 1931 |
| 2,070,421 | Chisholm | Feb. 9, 1937 |
| 2,106,608 | Kelley | Jan. 25, 1938 |
| 2,110,994 | Linsley | Mar. 15, 1938 |
| 2,124,507 | Hodgkins | July 19, 1938 |
| 2,160,385 | Kraemer | May 30, 1939 |
| 2,205,300 | Marsh | June 18, 1940 |
| 2,227,668 | Parker | Jan. 7, 1941 |
| 2,241,056 | Chilton | May 6, 1941 |
| 2,242,542 | Peterson | May 20, 1941 |
| 2,276,505 | Moore | Mar. 17, 1942 |
| 2,346,820 | Casler | Apr. 18, 1944 |
| 2,379,291 | Glass | June 26, 1945 |
| 2,402,419 | Larson | June 18, 1946 |